United States Patent
Farrell

(10) Patent No.: US 8,960,954 B1
(45) Date of Patent: Feb. 24, 2015

(54) SEA TURTLE LIGHT CONTROL SYSTEM AND METHOD

(71) Applicant: Geoffrey Farrell, Fort Lauderdale, FL (US)

(72) Inventor: Geoffrey Farrell, Fort Lauderdale, FL (US)

(*) Notice: Subject to any disclaimer, the term of this patent is extended or adjusted under 35 U.S.C. 154(b) by 8 days.

(21) Appl. No.: 14/048,865

(22) Filed: Oct. 8, 2013

(51) Int. Cl.
*F21S 8/08* (2006.01)
*H05B 37/02* (2006.01)

(52) U.S. Cl.
CPC ........ *H05B 37/0281* (2013.01); *H05B 37/0272* (2013.01)
USPC ........... 362/231; 362/230; 362/276; 362/265; 315/154; 315/129

(58) Field of Classification Search
CPC .............. H05B 33/0854; H05B 37/02; H05B 37/0218; H05B 33/0842; H05B 33/0845; F21S 8/086; F21V 9/08; F21W 2131/103; F21W 2131/10
USPC .............. 362/230, 231, 276, 153.1, 265, 293, 362/802; 315/129, 154, 297
See application file for complete search history.

(56) References Cited

U.S. PATENT DOCUMENTS

| | | | |
|---|---|---|---|
| 4,922,468 A | 5/1990 | Menezes | |
| 6,388,949 B1 | 5/2002 | Lenhardt | |
| 6,424,096 B1 | 7/2002 | Lowe et al. | |
| 6,471,369 B1 | 10/2002 | Valella, Jr. | |
| 6,690,120 B2 | 2/2004 | Oskorep et al. | |
| 7,093,956 B2 | 8/2006 | Miller et al. | |
| 7,194,209 B1 | 3/2007 | Robbins et al. | |
| 7,202,607 B2 | 4/2007 | Kazar et al. | |
| 7,855,376 B2 | 12/2010 | Cantin et al. | |
| 8,308,318 B2 | 11/2012 | Maxik | |
| 8,401,231 B2 | 3/2013 | Maxik et al. | |
| 8,491,153 B2* | 7/2013 | Maxik | 362/231 |
| 2006/0271340 A1* | 11/2006 | Levine | 702/188 |
| 2007/0008167 A1 | 1/2007 | Parker, Jr. et al. | |
| 2007/0109142 A1 | 5/2007 | McCollough, Jr. | |
| 2008/0043464 A1* | 2/2008 | Ashdown | 362/231 |
| 2010/0001652 A1 | 1/2010 | Damsleth | |
| 2010/0013608 A1 | 1/2010 | Petrisor et al. | |
| 2010/0277097 A1* | 11/2010 | Maxik | 315/294 |

FOREIGN PATENT DOCUMENTS

| | | |
|---|---|---|
| DE | 20071053138 | 8/2007 |
| DE | 102007049618 | 10/2007 |

(Continued)

*Primary Examiner* — Vibol Tan
(74) *Attorney, Agent, or Firm* — Robert C. Kain, Jr.

(57) ABSTRACT

Control system for sea turtle lights uses regulated lights, based upon satellite generated day signals and non-regulated lights. A user programmable timer permits the user to set time of day lighting operations. A seasonally fixed timer, fixed with a governmentally approved sea turtle season permits activation of the regulated lights. Outside of turtle season, non-regulated lights are used. The user turns ON and OFF the lights daily. An integrated lighting control system includes a central control unit having the user programmable timer and the seasonally fixed timer and the receiver with a processor and memory which generates lighting commands. A controllable light selector switch receives the lighting commands via a wired or wireless network. The method controls lights affecting sea turtles, which lights are subject to governmental regulation and seasonal operation. All light controls are further based upon the user set time of day and day of week lighting times.

6 Claims, 2 Drawing Sheets

(56) References Cited

FOREIGN PATENT DOCUMENTS

| | | |
|---|---|---|
| EP | 2055151 | 5/2009 |
| EP | 2154953 | 2/2010 |
| EP | 1108 223 | 1/2011 |
| EP | 2567402 | 3/2013 |
| WO | WO 03/055273 | 7/2003 |

* cited by examiner

SEA TURTLE LIGHT CONTROL SYSTEM AND METHOD

The present invention relates to a sea turtle lighting control system which is subject to governmental regulations for the use of regulated sea turtle lights and yet permits the owner of the building or facility subject to the governmental regulations to controllably program ON and OFF both the regulated sea turtle lights and the non-regulated or ordinary or customary lights.

BACKGROUND OF THE INVENTION

Along the ocean coastline, at defined times during the year, sea turtles nest and lay eggs on the shore. When the eggs hatch, the young sea turtles hopefully waddle towards the ocean, get caught up in the waves and are carried out to sea. A problem exists in that lights from the buildings along the shoreline sometimes distract the young sea turtles and these hatchlings waddle towards the building lights and away from the shoreline.

To solve this problem, government regulators have issued rules which require shoreline buildings to have a certain type of light (a set wavelength) during those times of year when the sea turtles are disturbed by the lights. This time period is called "sea turtle season" herein. Some building owners manually change the lights from "white light" to "amber light," wherein amber is the regulated sea turtle light.

For government regulations regarding sea turtle lighting issues, please see, for example, Florida Fish and Wildlife Conservation Commission, "Marine Turtles and Lights" at http://myfwc.com/wildlifehabitats/managed/sea-turtles/turtles-lights Aug. 22, 2013; the Federal Endangered Species Act of 1973; Florida's Marine Turtle Protection Act (Fla. Stat. 379.2431); and "Endangered Species Act (ESA)", by NOAA Fisheries, http://www.nmfs.noaa.gov/pr/laws/esa Aug. 22, 2013.

U.S. Pat. No. 6,471,369 discloses an outdoor light fixture for protecting sea turtles, which comprises a light for emitting wavelengths that are least visible to sea turtles but visible to humans which adequately illuminates outdoor human living spaces for safety without harming sea turtle nesting activity.

U.S. Patent Publication No. 2010/0013608 discloses a satellite located street light controller, which comprises a radio navigation satellite system (RNSS) receiver; a first electrical interface; and a lamp controller, wherein the first electrical interface is adapted to couple with a second electrical interface of a street light and the lamp controller is adapted to regulate a supply of power to a lamp of the street light via the first electrical interface based at least in part on information received by the RNSS receiver.

European Patent Publication No. EP 2567402A1 discloses a method of selecting appropriate lighting for protecting sea turtles, which comprises a low pressure mercury discharge lamp as the lighting control element provided with a phosphor layer as the at least one additional lighting control element and which encourages hatchlings to move toward sea following breakout.

U.S. Pat. No. 7,093,956 discloses a seasonal lighting to protect sea turtles, which comprises a low-voltage incandescent light source, and a red LED source that is visible to humans but that does not interfere with the normal nesting and hatching behavior of sea turtles and circuits includes program to selectively energize the latter source during turtle nesting season.

U.S. Pat. No. 8,401,231 discloses an outdoor lighting system for use in environmentally photo-sensitive areas, which comprises means for switching on or off the most desirable lights which would not inhibit adult female turtles from laying eggs along the sea coast and which also lures newly hatched turtles to safe areas.

European Patent Publication No. EP 2154953A1 discloses a light for guiding or herding aquatic animals, which comprises a light source used to herd and direct animals and the light source serves a physical barrier or enclosure (2) used to project light (3) which can be remotely controlled to lure or direct animals in an appropriate direction.

U.S. Patent Publication No. 2007/0109142 discloses a wireless control system for control of outdoor lighting.

European Patent Publication No. EP 2055151A1 discloses an illumination apparatus for emitting different types of light, which comprises one or more first light-emitting elements and one or more second light-emitting elements and a control system configured to control the operation of the one or more first and one or more second lightemitting elements.

U.S. Pat. No. 7,855,376 discloses a controller system for the emission and intensity of LEDs, which comprises light that in some ways reproduces incandescent or fluorescent lighting systems with higher efficiency and has a data/signal processor that controls the source controller and thus the light output of the visible-light source and may require an increase or decrease of intensity, or change of the parameters of output.

German Patent Publication No. DE 102007053138 discloses a controller connected to a sensor system for controlling outdoor lighting, which comprises power distribution device controlled by a controller and the controller is connected with the sensor system for surrounding detection over a uni-directional data exchange device.

European Patent Publication No. EP 1108223B9 discloses a method and an apparatus for broadcasting time of day from satellite to earth based satellite receivers, which comprises satellite positioning system (SPS) signals from an SPS receiver and which broadcasts information on time of day, approximate receiver location, and satellite positions.

OBJECTS OF THE INVENTION

It is an object of the present invention to provide a sea turtle light control system and method.

It is another object of the present invention to provide a control system wherein during sea turtle season, only regulated lights are turned ON and OFF based upon a user programmable timer system and, during non sea turtle season, only non regulated lights are turned ON and OFF, again based upon the user programmable day and time of day timers.

It is an additional object of the present invention to provide an integrated lighting control system.

It is another object of the present invention to provide an integrated system which is wirelessly coupled to remote lamp controllers which turn ON and OFF the unregulated or normal lights and which turn ON and OFF the sea turtle regulated lights or lamps during sea turtle season.

It is an additional object of the present invention to provide a method for controlling lights affecting sea turtles. The method involves independently activating the regulated lights in accordance with governmental regulations and in synchronism with satellite day signals.

SUMMARY OF THE INVENTION

The lighting control system for sea turtles is subject to governmental regulation during sea turtle season. The system and method uses regulated lights during turtle seasonal operation which is strictly based upon satellite generated day and time signals. The lighting control system includes regulated lights which are permitted for use during sea turtle season and non-regulated lights. A user programmable timer permits the user to set time of day lighting operations or day of week lighting operations or both. A seasonally fixed timer, fixed with a governmentally approved sea turtle light ON set day of the year and a governmentally approved sea turtle light OFF set day of the year is also used. The seasonal timer receives the satellite generated day and time signals and is synchronized with the satellite day signals.

A controllable power switch is controlled by the user programmable timer which applies time of day and day of week power to the lights. A controllable light selector switch is controlled by the seasonally fixed timer which applies time of day and day of week power to either (a) the regulated lights during sea turtle season or (b) the non-regulated lights at other seasonal times.

An integrated lighting control system includes a central control unit having the user programmable timer and the seasonally fixed timer and the receiver. The user programmable timer generates a time of day and day of week power signal. The seasonally fixed timer generates a sea turtle lights ON signal and a sea turtle lights OFF signal. The central control unit has a processor integrating the time and day power signal and the sea turtle lights ON and OFF signal and generates lighting commands based thereon. The controllable light selector switch is controllably coupled to the central controller and receives the lighting commands. This switch has a source of power for the regulated lights and the non-regulated lights. A wired or wireless network may be used.

The method controls lights affecting sea turtles, which lights are subject to governmental regulation as to the use of regulated lights and the seasonal operation of the regulated lights during sea turtle season. The method provides for regulated lights and non-regulated lights. The method permits a user to set time of day lighting operations or day of week lighting operations or both for independently operating sets of regulated lights and non-regulated lights. The method independently activates the regulated lights during sea turtle season, as synchronized by satellite day signals, and otherwise independently activates the non-regulated lights. All light controls are further based upon the user set time of day and day of week lighting times.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a sea turtle light control system and a method for independently turning ON and OFF regulated lights during sea turtle season and turning ON and OFF non-regulated lights outside of that season, and both being further controlled by a user programmable time of day and day program.

Similar numbers designate similar items throughout the specification of the drawings.

Figure 1:
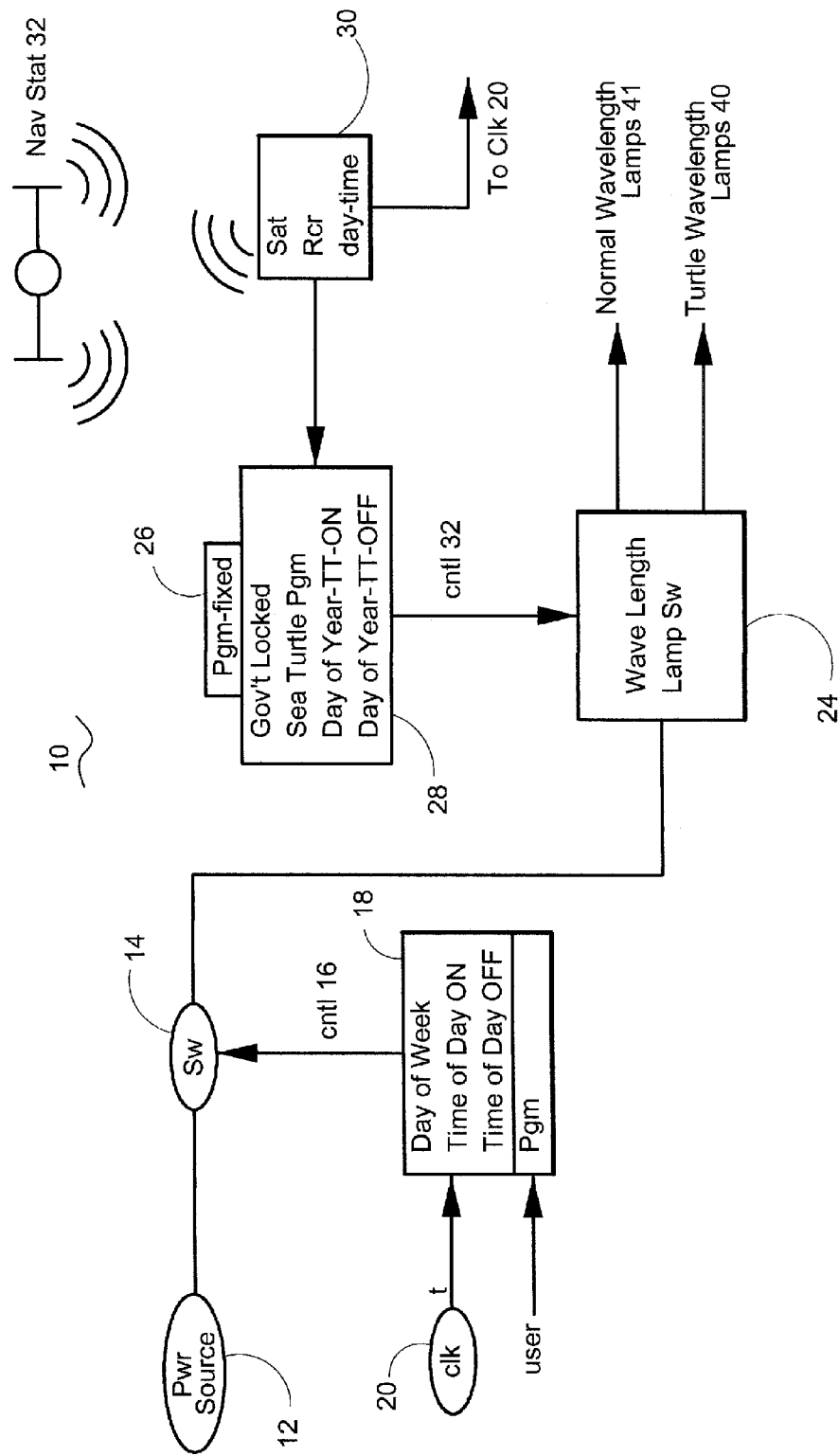
FIG. 1 diagrammatically illustrates one embodiment of the sea turtle light control system.

FIG. 1 diagrammatically illustrates one embodiment of the present invention for the sea turtle light control system 10. Power source 12, in the embodiment of FIG. 1, is coupled to a controllable power switch 14. Switch 14 turns ON and OFF the power based upon signals on control line 16. Certain abbreviations used in the specification and in the drawings are identified in the Abbreviations Table at the end of this patent specification.

Control signal 16 is based upon the output of user programmable timer 18. A user can program timer 18 based upon (a) day of the week and (b) the time of day. The user sets time of day and day ON and OFF. A clock 20 applies a time signal t to programmable timer 18. Of course, clock 20 may be integrated into programmable timer 18. Controllable power switch 14 is further electrically coupled to a controllable light selector switch 24. Selector switch 24 selects a particular wavelength lamp or light, one of these lights or light groups includes normal wavelength or non-regulated lamp 41. The other lights or lamps selected by controllable switch 24 are the regulated sea turtle wavelength lamps or lights 40. Of course, more than one light could be used in conjunction with light system 41 and light system 40. However, as discussed later, the system independently activates either non-regulated, normal wavelength lights 41 or independently, activates sea turtle or government regulated lights or lamps 40. Some lighting systems emit, on an independent, controllable basis, either the non-regulated light wavelength and at other times the regulated wavelength light. These lamps or lights are encompassed by the claims hereto.

The controllable light selector switch 24 is controlled by control signal 32 which is generated by the seasonally fixed timer 26. The seasonally fixed timer has a government approved and "locked" sea turtle program 28. Government regulations command when the sea turtle lights must be turned ON at a certain day of the year TT-ON and, at the end of the sea turtle season, the government locked or regulated program turns OFF the sea turtle lights. The end of the season is graphically identified as TT-OFF (turtle time off). In order to accurately determine the day and the time, the seasonally fixed timer 28 receives a signal from a satellite receiver 30 indicating the day and time of day. Satellite receiver 30 receives a satellite generated day and time signals from navigation satellite 32.

In some situations such as when the time changes from daylight savings time to ordinary time, the navigation satellite and/or the government locked and regulated program 28 adjusts the time of day time activating the sea turtle lamp 40. A feedback may be provided to the user programmable times.

A satellite navigation or sat nav system is a system of satellites that provide autonomous geo-spatial positioning with global coverage. It allows small electronic receivers to determine their location (longitude, latitude, and altitude) to within a few meters using time signals transmitted along a line-of-sight by radio from satellites. Receivers calculate the precise time as well as position, which can be used as a reference for scientific experiments. A satellite navigation system with global coverage may be termed a global navigation satellite system or GNSS.

In operation, the system controls the lights affecting sea turtles by activating ON the sea turtle lamp 40 and, at other times, which are beyond or outside the sea turtle season, activating ON the normal or non regulated lamp 41. The user is permitted to set the time of day lighting operations or day of week lighting operations by changing programmable timer 18. However, the regulated sea turtle lights 40 are turned ON independently as compared with the non regulated light 41. The control system is a mutually exclusive setting, one or the other. The control over wavelength light selectors 24 is based exclusively upon the government locked and approved program 28 for the sea turtle season.

Figure 2:
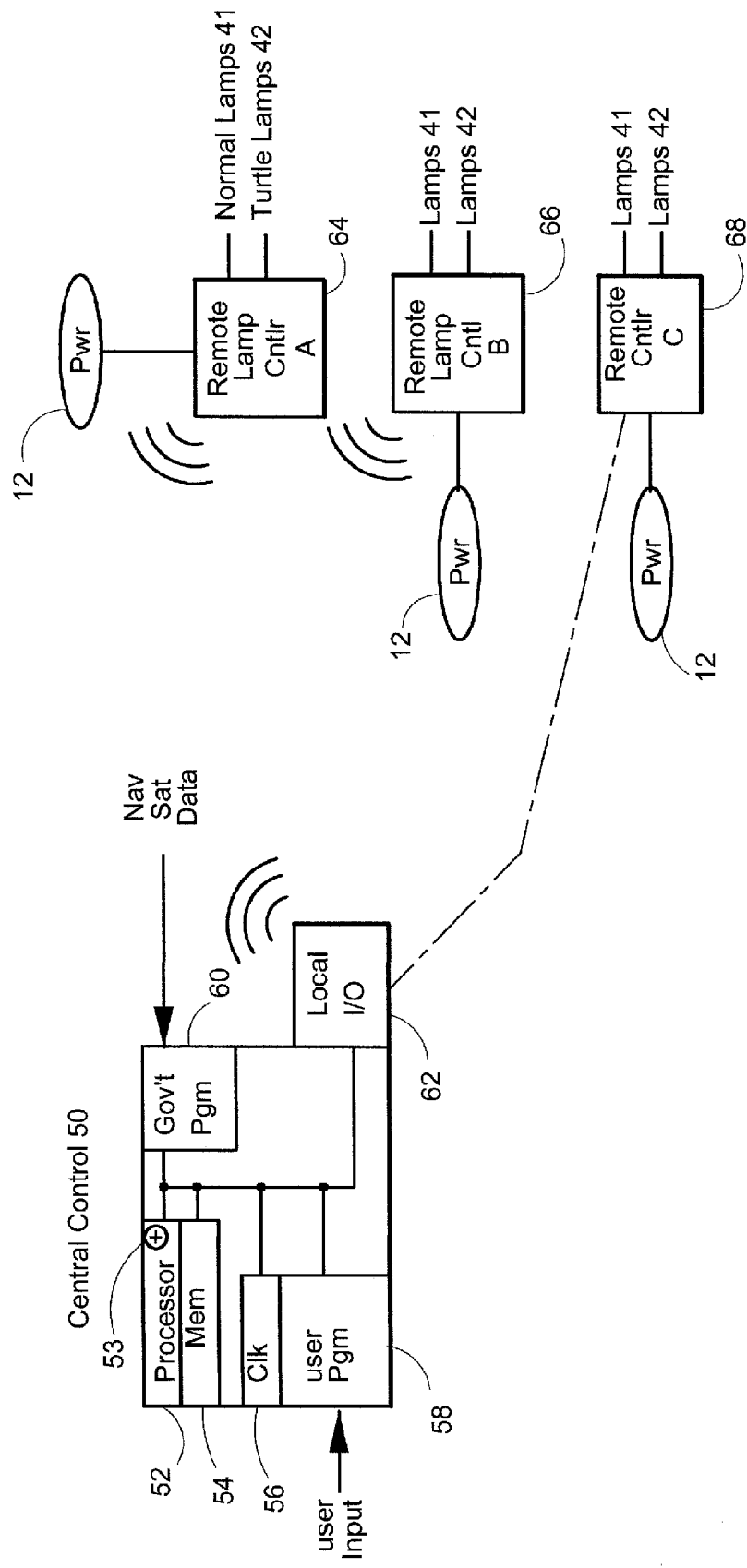
FIG. 2 diagrammatically illustrates a single integrated control system which regulates the lights which are turned ON and OFF dependent upon both sea turtle season and the user programmable day and time of day timers.

FIG. 2 diagrammatically illustrates another embodiment of the present invention wherein the two timing signals, one from the user programmable timer 18 and the second from the government locked timer 28 are integrated into a central control unit 50. The processor and memory integrates or sums the signals with a logic operation.

Central control unit 50 includes processor 52, memory 54, a clock functional module 56, and a user selectable programming functional module 58. A user inputs information into the user programmable timer function and this data is processed by processor 52 as stored in memory 54. The government fixed sea turtle ON/OFF program is stored in functional module 60. The navigation satellite data is applied to the central control unit 50 and is processed by the government logic ON/OFF program 60.

In the illustrated embodiment of FIG. 2, some of the controllable light selector switches are remote lamp controllers. Accordingly, remote lamp controller A-64 is remote and separate from central control unit 50. Another controllable light selector and lamp controller B-66 is also independent and wirelessly connected to central control unit 50. Remote controller C-68 is wired via some type of hard wire or computer network to input/output unit 62 associated with central control unit 50. The local I/O unit 62 may also include a wireless transceiver device which is communicatively coupled to remote light selectors 64, 66. Power is supplied to the remote lamp controllers 64, 66 and 68.

Returning to central control unit 50, the central control unit includes a user programmable timer 58 which generates the time of day and day of week power signal and is ultimately controlled by user input. The seasonally fixed timer 60 is fixed by the government program and generates a sea turtle lights ON signal and a sea turtle lights OFF signal during turtle season. During these signal periods, sea turtle nesting may occur. The processor 52 has an integrator 53 which integrates the user programmable day and time with the seasonal light selector program 60. The result is that processor 52 and generally central control unit 50 generate a lighting commands which are sent either by wireless network or wired network to remote lamp controllers 64, 66 and 68.

In the drawings, and sometimes in the specification, reference is made to certain abbreviations. The following Abbreviations Table provides a correspondence between the abbreviations and the item or feature.

ABBREVIATIONS TABLE bd board
clk clock or device for generating a clock time signal
comm. communications, typically telecommunications
comp computer having internet enabled communications module
cntl control, as in control signal for a switch
cntlr controller, generally an electronic device that controls another device
CPU central processing unit
e.g. for example
Geo geographic location or code (geo.loc. is GPS data)
Gov't government or agency or organization authorized by the government
I/O input/output
mem memory
Nav Sat navigation satellite
ntwk network, namely a communications network coupling electronic devices
pgm program
PWR power source
rcr receiver
re regarding or relating to
rt real time, may include day and time stamp data
sat satellite
sys system
Sys Op System Operator
sw switch
t time
telecom telecommunications system or network
TT turtle time, TT-ON refers to turtle time light ON and TT-OFF refers to the turtle lights being turned OFF
w/ with
w/in within
w/out without
wrt with respect to Description of Typical System Features The system described above uses either computer enabled devices or processor driven devices. The programs to turn ON and OFF the turtle lights or lamps may be fixed in PLDs or programmable logic devices. These devices (computers, processors and PLDs) operate with external or on-board memory to achieve the functionality described herein.

One embodiment of the present invention relates to a remote control lighting system which processes control data via computer systems, over the Internet and/or on a computer network (LAN or WAN).

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The functions present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described.

The invention is not limited to any particular computer program or logic or language, or instruction but may be practiced with any such suitable program, logic or language, or instructions as would be known to one of ordinary skill in the art.

The claims appended hereto are meant to cover modifications and changes within the scope and spirit of the present invention.

What is claimed is:

1. A lighting control system for sea turtles which is subject to governmental regulation as to the use of regulated lights and the seasonal operation of said regulated lights during sea turtle season, the lighting control system receiving satellite generated day and time signals and comprising:
   one or more regulated lights which are permitted for use during sea turtle season;
   one or more non-regulated lights;
   a user programmable timer permitting the user to set time of day lighting operations or day of week lighting operations or both;
   a seasonally fixed timer, with a governmentally approved sea turtle lights ON set day of the year and a governmentally approved sea turtle lights OFF set day of the year, the seasonal timer having a receiver for receiving said satellite generated day and time signals and being synchronized with the satellite day signals;
   a controllable power switch controlled by said user programmable timer which applies time of day and day of week power to the lights; and
   a controllable light selector switch controlled by said seasonally fixed timer which applies time of day and day of week power to either (a) said regulated lights during sea turtle season or (b) said non-regulated lights at other seasonal times.

2. The lighting control system as claimed in claim 1 wherein the seasonally fixed timer is adjusted based upon said satellite generated day and time signals.

3. The lighting control system as claimed in claim 1 wherein said user programmable timer and said seasonally fixed timer are serially connected between a power supply and said regulated lights and said non-regulated lights.

4. The lighting control system as claimed in claim 1 including a central control unit,
   said central control unit having therein said user programmable timer and said seasonally fixed timer and said receiver;
   user programmable timer having means for generating a time of day and day of week power signal;
   said seasonally fixed timer having means for generating a sea turtle lights ON signal and a sea turtle lights OFF signal;
   said central control unit having a processor integrating the time and day power signal and the sea turtle lights ON and OFF signal and generating lighting commands based thereon; and
   said controllable light selector switch being controllably coupled to said central controller and receiving said lighting commands and a source of power such that power is applied to either said regulated lights or said non-regulated lights based upon said lighting commands.

5. The lighting control system as claimed in claim 4 wherein said central control unit is either wired to said controllable light selector switch or is communicatively coupled to said controllable light selector switch via a wireless network.

6. A method for controlling lights affecting sea turtles, which lights are subject to governmental regulation as to the use of regulated lights and the seasonal operation of said regulated lights during sea turtle season comprising:
   providing one or more regulated lights which regulated lights are permitted for use during sea turtle season and one or more non-regulated lights;
   permitting a user to set time of day lighting operations or day of week lighting operations or both for independently operating sets of regulated lights and non-regulated lights;
   independently activating said regulated lights during sea turtle season based upon a seasonally fixed program approved by a governmental sea turtle regulations and synchronized with the satellite day signals, said activation of regulated lights further based upon said user set time of day and day of week lighting times;
   and otherwise independently activating said non-regulated lights at times other than proscribed by said seasonally fixed program and further based upon said user set time of day and day of week lighting times.

* * * * *